(12) United States Patent
Kasamatsu et al.

(10) Patent No.: US 12,406,839 B2
(45) Date of Patent: Sep. 2, 2025

(54) MASS SPECTROMETRY METHOD AND MASS SPECTROMETER

(71) Applicant: SHIMADZU CORPORATION, Kyoto (JP)

(72) Inventors: Satoshi Kasamatsu, Kyoto (JP); Kengo Takeshita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 376 days.

(21) Appl. No.: 17/923,089

(22) PCT Filed: May 14, 2020

(86) PCT No.: PCT/JP2020/019350
§ 371 (c)(1),
(2) Date: Nov. 3, 2022

(87) PCT Pub. No.: WO2021/229772
PCT Pub. Date: Nov. 18, 2021

(65) Prior Publication Data
US 2023/0162959 A1    May 25, 2023

(51) Int. Cl.
*H01J 49/04* (2006.01)
*H01J 49/00* (2006.01)
*H01J 49/16* (2006.01)

(52) U.S. Cl.
CPC ...... *H01J 49/0409* (2013.01); *H01J 49/0004* (2013.01); *H01J 49/164* (2013.01)

(58) Field of Classification Search
CPC .. H01J 49/0409; H01J 49/0004; H01J 49/164; G01N 27/62
See application file for complete search history.

(56) References Cited

U.S. PATENT DOCUMENTS

| 2005/0046854 | A1 | 3/2005 | Kunuki et al. |
| 2011/0215233 | A1* | 9/2011 | Vertes ................ H01J 49/0463 250/282 |
| 2013/0080072 | A1 | 3/2013 | Ikegami |

FOREIGN PATENT DOCUMENTS

| JP | 2005-98997 A | 4/2005 |
| JP | 2013-068565 A | 4/2013 |

(Continued)

OTHER PUBLICATIONS

Written Opinion of PCT/JP2020/019350 dated Aug. 18, 2020 [PCT/ISA/237].

(Continued)

*Primary Examiner* — David E Smith
*Assistant Examiner* — Christopher J Gassen
(74) *Attorney, Agent, or Firm* — Sughrue Mion, PLLC

(57) ABSTRACT

A mass spectrometry method including: focusing an excitation beam by an excitation beam optical system at a predetermined position of the sample stage, and recording a position of a beam irradiation system including the excitation beam optical system and a movable sample stage at that time as a reference position and a temperature of the beam irradiation system at that time as a reference temperature (Steps 1 and 2); acquiring temperature dependency information which is information representing a change in position of the excitation beam optical system and the sample stage with respect to a change in temperature of the beam irradiation system and recording the temperature dependency information (Step 3); and correcting a focusing position of an excitation beam using the moving mechanism based on a difference between a temperature of the beam irradiation system during use and the reference temperature and the temperature dependency information (Step 7).

6 Claims, 3 Drawing Sheets

(56) References Cited

FOREIGN PATENT DOCUMENTS

JP          2020051751 A  *  4/2020  .......... H01J 49/0004
WO    WO-2014027447 A1 *  2/2014  ............ H01J 49/164

OTHER PUBLICATIONS

International Search Report of PCT/JP2020/019350 dated Aug. 18, 2020 [PCT/ISA/210].
Japanese Office Action dated Sep. 19, 2023 in Application No. 2022-522453.
Office Action issued Mar. 30, 2024 in Chinese Application No. 202080099675.X.
Chinese Office Action dated Oct. 31, 2024 in Application No. 202080099675.X.
Office Action issued Feb. 13, 2025 in Chinese Application No. 202080099675.X.

* cited by examiner

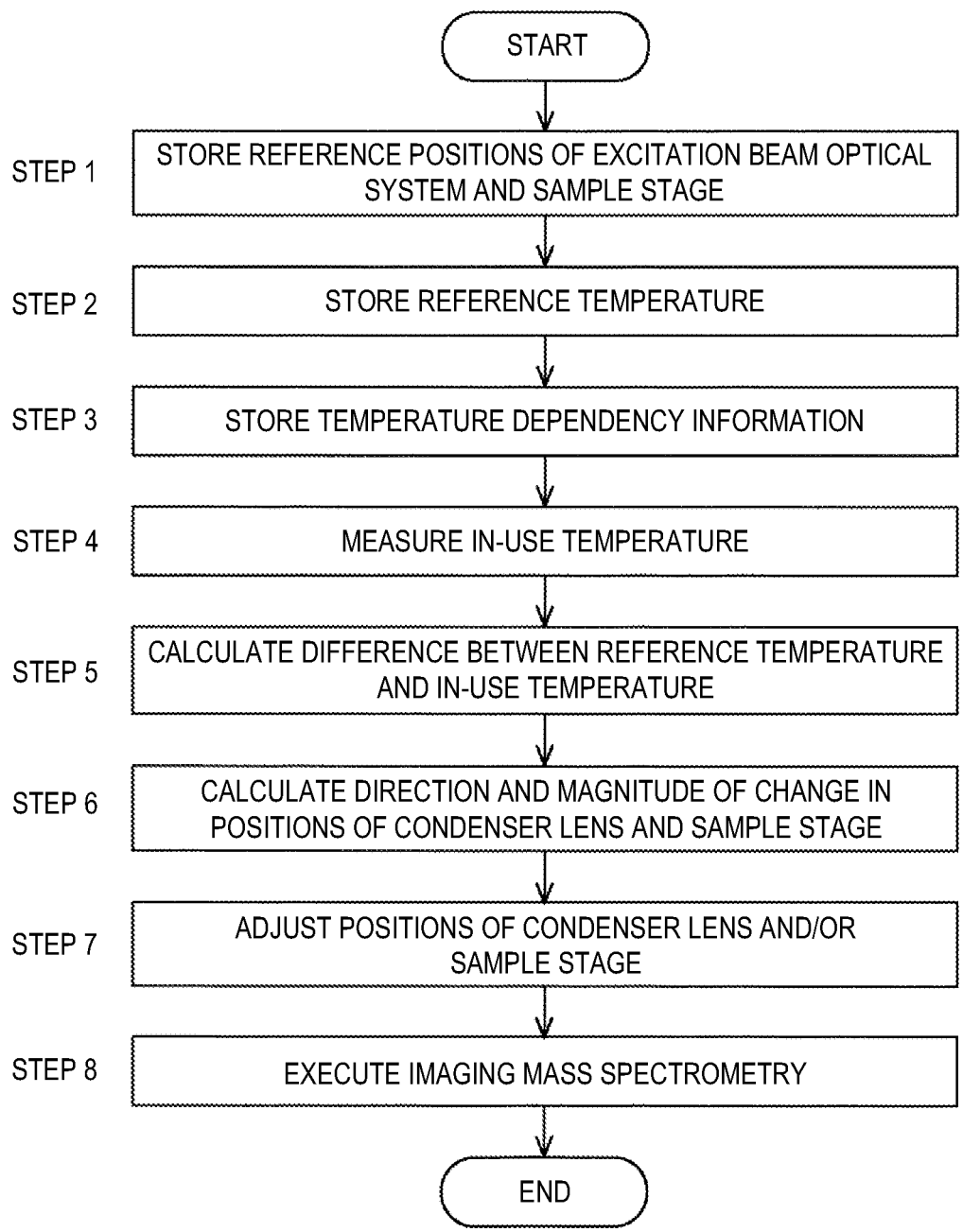

MASS SPECTROMETRY METHOD AND MASS SPECTROMETER

CROSS REFERENCE TO RELATED APPLICATIONS

This application is a National Stage of International Application No. PCT/JP2020/019350 filed on May 14, 2020.

TECHNICAL FIELD

The present invention relates to a mass spectrometry method and a mass spectrometer.

BACKGROUND ART

An imaging mass spectrometer is used to observe distribution of a target substance in a sample such as a cell. In the imaging mass spectrometer, in order to observe distribution of a target substance in a target region on a sample surface, a plurality of measurement points two-dimensionally distributed in the target region are set, and each measurement point is sequentially irradiated with laser light to ionize substances present at each measurement point, and mass spectrometry is performed. By this mass spectrometry, mass spectrum is obtained for each measurement point. By extracting intensity of a mass peak of a mass-to-charge ratio of ions characteristic of the target substance from the mass spectrum of each measurement point thus obtained and creating an image in which the intensities of the mass peak at the measurement points are mapped on the target region, it is possible to observe distribution of the target substance in the target region on the sample surface (for example, Patent Literature 1).

In an imaging mass spectrometer, light emitted from a laser light source is focused by a condenser lens and spotted on a sample. A sample stage on which a sample is placed is movable in two directions (x and y directions) parallel to a sample placement surface and one direction (z direction) perpendicular to the x and y directions. When imaging mass spectrometry is performed, positions of the condenser lens and the sample stage are adjusted before start of the mass spectrometry, and laser light is focused at a predetermined position on a surface of a sample placed on the sample stage. Subsequently, the sample is irradiated with laser light having a plurality of different energies to perform mass spectrometry, and energy of laser light by which ions characteristic of a target substance are detected with a highest intensity is determined. After optimum energy for the target substance is determined, imaging mass spectrometry is performed at each measurement point using laser light of the energy.

CITATION LIST

Patent Literature

Patent Literature 1: JP 2013-068565 A

SUMMARY OF INVENTION

Technical Problem

In recent years, it has become possible to focus laser light into a finer diameter of about 5 μm, and to perform imaging mass spectrometry with very high spatial resolution by using such laser light of a fine diameter. On the other hand, when temperature (environmental temperature) of a place where an imaging mass spectrometer is placed changes, a condenser lens, a sample stage, or a member (frame) that holds them expands or contracts. In a case of a normal imaging mass spectrometer, the frame or the like may expand or contract by about 10 μm at a temperature change of 1° C. depending on the material and size of the frame or the like. When the frame or the like expands or contracts, the distance between the condenser lens and the sample stage changes, and the focal position of laser light is shifted (defocused), causing an increase in the irradiation diameter of laser light, and deterioration of the spatial resolution of imaging mass spectrometry. Further, when laser light having an optimum energy is emitted, the diameter of the laser light is larger than that when the energy is determined optimum, and the energy density on the measurement point is lower than optimum. It follows that ionization efficiency is deteriorated. In addition to that, when the sample stage expands or contracts in a sample placement surface of the sample stage, an irradiation position of laser light is shifted in an irradiation surface.

When an imaging mass spectrometry is performed sometime after a previous mass spectrometry, the environmental temperature may have changed from that of the previous mass spectrometry, and the position between the condensing optical system and the sample stage may have changed from that of the previous mass spectrometry. Therefore, if precise mass spectrometry is demanded, the user needs to adjust positions of the condensing optical system and the sample stage before starting the mass spectrometry. There has been a problem that, since it is unknown in which direction and how much a position of the condenser lens, the sample stage, or the frame have changed from the previous mass spectrometry, the user has to move the position of the condensing optical system and/or the sample stage little by little in various directions, adjust the positions of the condensing optical system and/or the sample stage by trial and error, and focus laser light on the sample on the sample stage, for which work takes time and effort. If a temperature control mechanism is provided to the imaging mass spectrometer, the above work can be omitted, but there has been a problem that the apparatus becomes expensive.

Here, the case where laser light is used as an excitation beam for ionizing a substance present on a sample surface is described as an example. However, the same problem as described above also occurs in a case where another type of excitation beam such as an electron beam is used.

A problem to be solved by the present invention is to provide a technique for easily and inexpensively causing a focusing position of an excitation beam to coincide with a position of a sample surface in a mass spectrometer.

Solution to Problem

The present invention made to solve the above problems is a mass spectrometry method for focusing an excitation beam by an excitation beam optical system and irradiating a sample stage movable by a moving mechanism on a fixed base fixed to the excitation beam optical system with the excitation beam, the mass spectrometry method including steps of:

focusing an excitation beam at a predetermined position of the sample stage, and recording a position of a beam irradiation system including the excitation beam optical system and the sample stage at that time as a reference position and a temperature of the beam irradiation system at that time as a reference temperature;

acquiring temperature dependency information which is information representing a change in position of the beam irradiation system with respect to a change in temperature of the beam irradiation system and recording the temperature dependency information; and correcting a focusing position of an excitation beam using the moving mechanism based on the reference position, a difference between a temperature of the beam irradiation system during use and the reference temperature, and the temperature dependency information.

Further, a mass spectrometer according to the present invention made to solve the above problems includes:

a sample stage;

an excitation beam optical system configured to focus an excitation beam and irradiate the sample stage with the excitation beam;

a moving mechanism configured to move the sample stage on a fixed base fixed to the excitation beam optical system;

a temperature measurement unit configured to measure temperature of a beam irradiation system including the excitation beam optical system and the sample stage;

a storage unit that stores a reference position which is a position of the beam irradiation system when the excitation beam is focused on a predetermined position of the sample stage when the beam irradiation system is at a certain reference temperature, and temperature dependency information which is information representing a change in position of the beam irradiation system with respect to a change in temperature of the beam irradiation system; and a position correction unit configured to correct a focusing position of an excitation beam using the moving mechanism based on the reference position, a difference between temperature of the beam irradiation system measured by the temperature measurement unit and the reference temperature, and the temperature dependency information.

Advantageous Effects of Invention

In the present invention, before mass spectrometry is performed, an excitation beam is focused on a predetermined position of a sample stage, and the position of a beam irradiation system including an excitation beam optical system and the sample stage and temperature of the beam irradiation system are recorded as a reference position and a reference temperature. A positional relationship between the excitation beam optical system and the sample stage is determined such that an excitation beam is focused on a predetermined position on the sample stage from the reference position. Further, temperature dependency information, which is information representing a change in position of the beam irradiation system with respect to a change in temperature of the beam irradiation system, is acquired and recorded. The temperature dependency information may be obtained by individually recording a change in position of each of the excitation beam optical system and the sample stage, may be obtained by recording a change in relative position of the excitation beam optical system and the sample stage, or may be obtained by recording a change in focusing position of an excitation beam on the sample stage.

When mass spectrometry is performed, temperature of the beam irradiation system is measured. Then, a focusing position of an excitation beam is corrected using a moving mechanism based on the reference position, a difference between a measured temperature (in-use temperature) and reference temperature, and the temperature dependency information. For example, positions of the excitation beam optical system and/or the sample stage are adjusted so as to reproduce a positional relationship between the excitation beam optical system and the sample stage determined based on the reference position.

In the present invention, it is only necessary to determine positions of the sample stage and the excitation beam optical system at which an excitation beam is focused at the in-use temperature, and to move the sample stage and the excitation beam optical system to the positions in a pinpoint manner based on position information of the beam irradiation system including the sample stage and the excitation beam optical system at a reference temperature, the temperature dependency information, and a difference between the reference temperature and the in-use temperature. Therefore, it is possible to easily focus an excitation beam on a sample placed on the sample stage without trial and error as in the related art. Further, since it is not necessary to provide a temperature control mechanism in the present invention, mass spectrometry can be performed at low cost.

BRIEF DESCRIPTION OF DRAWINGS

FIG. 3 is a flowchart of an imaging mass spectrometry method which is an embodiment of a mass spectrometry method according to the present invention.

DESCRIPTION OF EMBODIMENTS

An imaging mass spectrometry method and an imaging mass spectrometer, which are an embodiment of a mass spectrometry method and a mass spectrometer according to the present invention, will be described below with reference to the drawings.

An imaging mass spectrometer 1 of the present embodiment generates ions by a matrix assisted laser desorption/ionization (MALDI) method and performs mass spectrometry, and generates ions at each of a plurality of measurement points on a surface of a sample placed on a sample stage and performs mass spectrometry.

Figure 1:
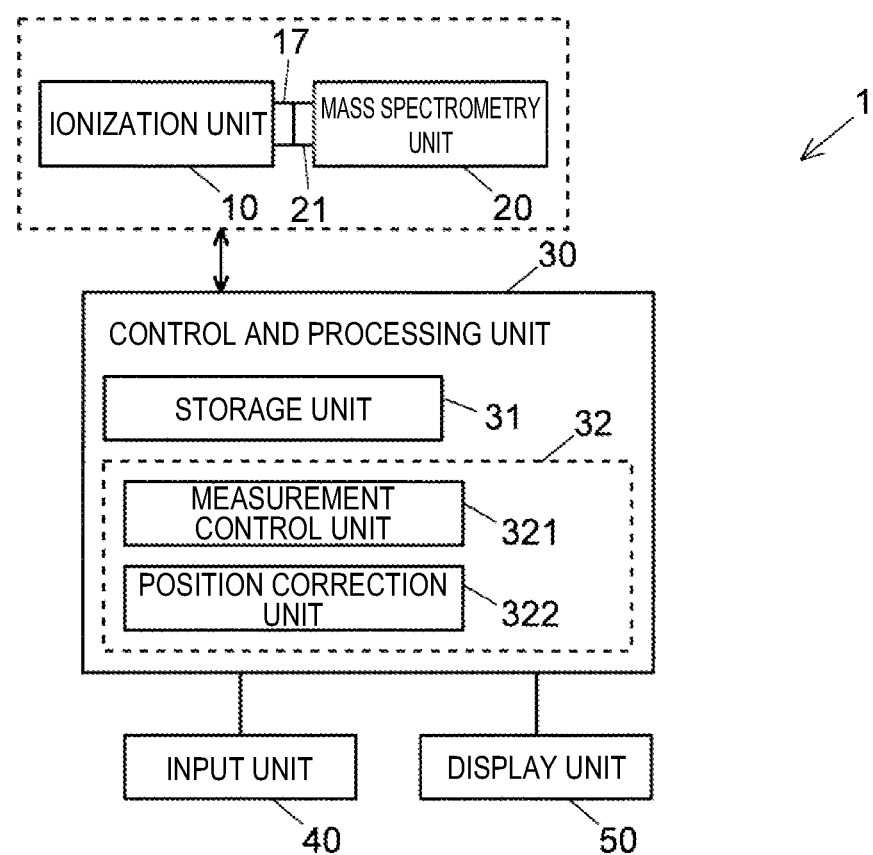
FIG. 1 is a configuration diagram of a main part of an imaging mass spectrometer which is an embodiment of a mass spectrometer according to the present invention.

As illustrated in a block diagram in FIG. 1, the imaging mass spectrometer 1 roughly includes an ionization unit 10, a mass spectrometry unit 20, and a control and processing unit 30.

Figure 2:
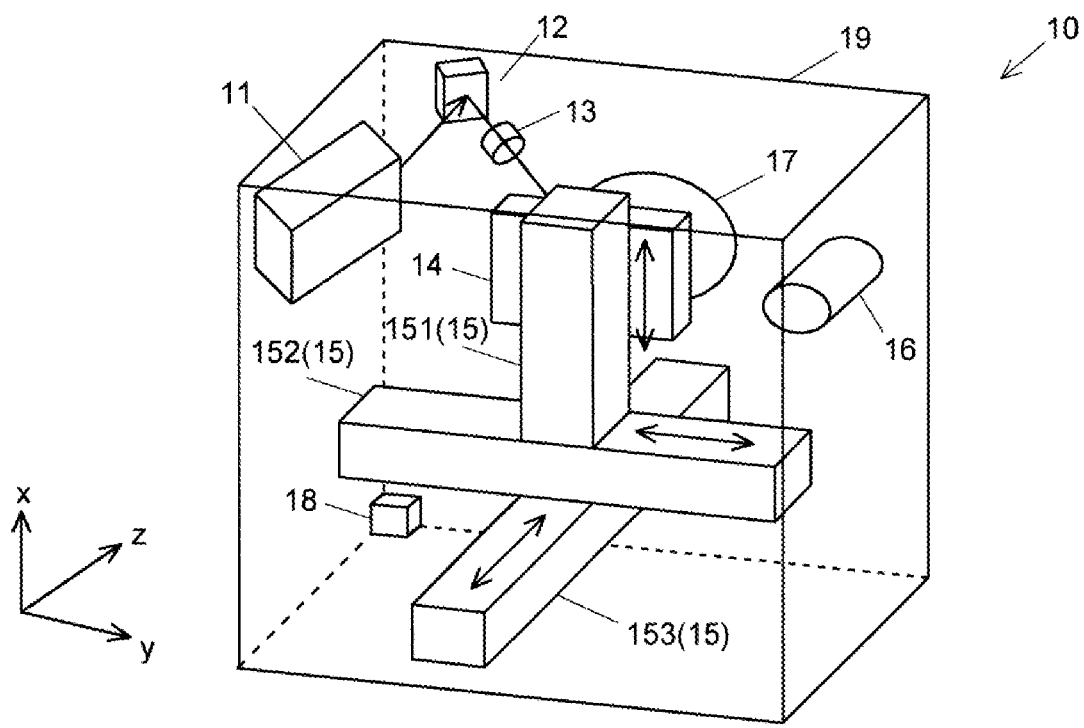
FIG. 2 is a diagram illustrating a schematic configuration of an ionization unit of the imaging mass spectrometer of the present embodiment.

FIG. 2 illustrates a schematic configuration of the ionization unit 10. The ionization unit 10 includes a laser light source 11, a reflecting mirror 12, and a condenser lens 13. The laser light source 11, the reflecting mirror 12, and the condenser lens 13 (hereinafter, these are also referred to as "excitation beam optical system") are fixed to a housing 19 directly or indirectly via a holding member (frame). The housing 19 corresponds to a fixed base fixed to the excitation beam optical system in the present invention. In the present embodiment, a position of a sample stage 14 is movable in three directions orthogonal to each other by a stage moving mechanism 15 to be described later, by which relative positions of the condenser lens 13 and the sample stage 14 are adjusted. However, both the condenser lens 13 and the sample stage 14 may be provided with a moving mechanism that can move them. As a moving mechanism of the condenser lens 13, for example, a configuration similar to that of the stage moving mechanism 15 described later can be used.

Further, the ionization unit 10 includes the sample stage 14, the stage moving mechanism 15, a microscope 16, and a temperature measurement unit 18. An opening 17 is formed on one side surface of the housing 19. The stage moving mechanism 15 is fixed to the housing 19. That is, the stage moving mechanism 15 corresponds to a moving mechanism on the fixed base (housing 19) in the present invention. Note that, in FIG. 2, the temperature measurement unit 18 is arranged at one corner of a lower portion of the housing 19, but may be arranged at an appropriate position where temperature of the excitation beam optical system, the sample stage 14, and the stage moving mechanism 15 (hereinafter, these are also referred to as "beam irradiation system") can be measured. However, it is preferable to arrange the temperature measurement unit 18 at a position close to the beam irradiation system.

The sample stage 14 is movable in three directions orthogonal to each other by the stage moving mechanism 15. The stage moving mechanism 15 includes a first linear guide 151 for moving the sample stage 14 in a vertical direction (x direction), a second linear guide 152 for moving the sample stage 14 and the first linear guide 151 in a horizontal direction (y direction), a third linear guide 153 for moving the sample stage 14, the first linear guide 151, and the second linear guide 152 in a horizontal direction (z direction), and a drive source for operating them. The drive source includes, for example, a stepping motor.

The microscope 16 is provided in the housing 19 and is used to observe a sample placed on the sample stage 14. The stage moving mechanism 15 moves the sample stage 14 to an observation position (front of the microscope 16), and a sample surface is observed with the microscope 16, so that a region of interest of the sample is set as a target region. Further, a plurality of measurement points are set in the target region.

When the imaging mass spectrometry is performed, the sample stage 14 is moved so that the target region of the sample surface is positioned in front of the opening 17 formed on a side surface of the housing 19. Then, light emitted from the laser light source 11 and reflected by the reflecting mirror 12 is focused by the condenser lens 13, and a measurement point in the target region of the sample surface is irradiated with the light. Ions generated from the sample by the irradiation of the laser light are emitted from the opening 17 to the outside of the housing 19.

The ionization unit 10 is detachably attached to the mass spectrometry unit 20. An opening 21 is formed at a position corresponding to the opening 17 of the ionization unit 10 on a side surface of the housing of the mass spectrometry unit 20 on the side to which the ionization unit 10 is attached. The mass spectrometry unit 20 performs mass spectrometry of ions incident through the opening 21. The mass spectrometry unit 20 accommodates an ion optical system such as an ion lens that focuses incident ions, a mass separation unit such as a quadrupole mass filter that separates ions focused by the ion optical system according to a mass-to-charge ratio, and an ion detector that detects ions separated by the mass separation unit.

The control and processing unit 30 controls operations of the ionization unit 10 and the mass spectrometry unit 20, and performs processing such as creation of imaging mass spectrometry data on the basis of an output signal from an ion detector of the mass spectrometry unit 20. The control and processing unit 30 includes a measurement control unit 321 and a position correction unit 322 as functional blocks in addition to a storage unit 31. The substance of the control and processing unit 30 is a general computer, and functions of the measurement control unit 321 and the position correction unit 322 are embodied as mass spectrometry software 32 installed in advance is executed by a processor. Further, an input unit 40 for the user to perform appropriate input operation and a display unit 50 for displaying various types of information are connected to the control and processing unit 30. The storage unit 31 stores information in which a reference temperature and a reference position are associated with each other, and temperature dependency information. These pieces of information will be described later.

The present embodiment is characterized by processing of correcting a focusing position of laser light according to a change in temperature (environmental temperature) of the beam irradiation system before executing imaging mass spectrometry of an actual sample. A process of this processing will be described with reference to a flowchart of FIG. 3. Hereinafter, in the excitation beam optical system, the laser light source 11 and the reflecting mirror 12 are assumed not to change in position even if environmental temperature changes.

In the imaging mass spectrometer 1 of the present embodiment, reference positions of the excitation beam optical system and the sample stage 14 are acquired and stored in advance. This is performed, for example, by a manufacturer at the time of shipment or by the user at the time of installation. Specifically, in acquisition of the reference position, positions of the condenser lens 13 and the sample stage 14 are adjusted so that laser light is focused at a predetermined position on the sample stage 14 (for example, a position of a measurement start point set for a sample placed on the sample stage 14), and the positions of the condenser lens 13 and the sample stage 14 at that time are measured. The positions of the condenser lens 13 and the sample stage 14 can be defined as relative positions with respect to a predetermined position (for example, an angle closest to the sample stage 14 and the condenser lens 13) of the housing 19 with an appropriate location according to a shape of the condenser lens 13 or the sample stage 14, such as a position of the center of gravity of the condenser lens 14 or a position of a corner portion of the sample stage 13, as a reference. Alternatively, a position of the sample stage 14 may be defined with reference to a position of the condenser lens 13 (in this case, a position of the condenser lens 13 is the origin). The positions of the condenser lens 13 and the sample stage 14 thus measured are stored in the storage unit 31 as reference positions (Step 1). Further, temperature at the time when these positions are measured is measured by the temperature measurement unit 18 and stored in the storage unit 31 as a reference temperature in association with the reference position (Step 2). A positional relationship between the condenser lens 13 and the sample stage 14 is determined such that laser light is focused at a predetermined position on the sample stage 14 from the reference position.

The reference temperature is preferably an average temperature in a use environment of the imaging mass spectrometer 1. Specifically, for example, the reference temperature may be in a range of 25° C. to 30° C. In this manner, when positions of the condenser lens 13 and the sample stage 14 are corrected, it is possible to suppress a shift of a focusing position of laser light caused by an error in the temperature dependency information described below.

Further, information on a change in a position of the condenser lens 13 with respect to a change in temperature (a direction and a size of the change) and information on a change in a position of the sample stage 14 with respect to a change in temperature (a direction and a size of the change) are acquired and stored in the storage unit 31 as the temperature dependency information (Step 3). A change in positions of the condenser lens 13 and the sample stage 14 can be theoretically calculated from, for example, a volume expansion and contraction ratio of a material constituting the condenser lens 13, the sample stage 14 itself, and the member holding them. Alternatively, the configuration may be such that positions of the condenser lens 13 and the sample stage 14 are measured at a plurality of temperatures, and a change in the positions of the condenser lens 13 and the sample stage 14 with respect to a change in environmental temperature is calculated as an approximate function (approximate straight line or approximate curve).

The temperature dependency information may be created by excluding a member which can be regarded as not substantially changing positions of the condenser lens 13 and the sample stage 14 even if expansion or contraction occurs in the member, such as a member made from a material having a small volume expansion and contraction ratio with respect to a temperature change, or a member itself having a small size among the condenser lens 13, the sample stage 14, and the stage moving mechanism 15. That is, it is not always necessary to create the temperature dependency information for all of the condenser lens 13, the sample stage 14 itself and all the members holding them. For example, it is possible to exclude a member having a change amount, by which positions of the condenser lens 13 and the sample stage 14 are changed with respect to a temperature change (for example, a temperature change of 10° C.) assumed in a use environment of the imaging mass spectrometer 1, equal to or less than a diameter (for example, 5 μm) of laser light focused by the excitation beam optical system by regarding the member as one that does not substantially change positions of the condenser lens 13 and the sample stage 14. Examples of such a member include a member (quartz glass or the like) made from a silicon single crystal or a silicon compound which is a material having a small thermal expansion coefficient.

When the user instructs start of measurement using the imaging mass spectrometer 1, the measurement control unit 321 measures temperature of the beam irradiation system with the temperature measurement unit 18 (Step 4). Hereinafter, this temperature is referred to as "in-use temperature".

When temperature of the beam irradiation system is measured, the position correction unit 322 calculates a difference between a reference temperature stored in the storage unit 31 and the in-use temperature (Step 5). Further, the position correction unit 322 also reads the reference position information and the temperature dependency information stored in the storage unit 31. Subsequently, on the basis of the temperature dependency information, a direction and magnitude of a change in positions of the condenser lens 13 and the sample stage 14 caused by the temperature difference are calculated (Step 6).

After calculating a direction and magnitude of a change in positions of the condenser lens 13 and the sample stage 14, the position correction unit 322 adjusts a position of the sample stage 14 with the stage moving mechanism 15 so as to correct the direction and magnitude of the change (Step 7). Specifically, the position of the sample stage 14 is changed so as to be the same as a relative positional relationship between the condenser lens 13 and the sample stage 14 at the reference position. In this manner, the laser light is focused on a predetermined position of a sample placed on the sample stage 14. In the present embodiment, a relative position between the condenser lens 13 and the sample stage 14 is corrected as a position of the sample stage 14 is adjusted. However, a position of the condenser lens 13 may be adjusted, or positions of both the condenser lens 13 and the sample stage 14 may be adjusted.

In recent years, it is possible to focus laser light into a fine diameter of about 5 μm, and imaging mass spectrometry can be performed with very high spatial resolution by using such laser light of a fine diameter. However, when positions of the condenser lens 13 and the sample stage 14 greatly change (for example, by more than 5 μm) due to a change in temperature (environmental temperature) of a place where the imaging mass spectrometer 1 is arranged, laser light is defocused and is not focused on a sample on the sample stage 14, and even if laser light focused to a fine diameter is used, resolution corresponding to the fine diameter cannot be obtained. For this reason, conventionally, in a case where imaging mass spectrometry is performed with high resolution after the previous mass spectrometry, the user has adjusted positions of the condenser lens 13 and the sample stage 14 before starting mass spectrometry.

However, in the conventional imaging mass spectrometer, how the condenser lens 13, the sample stage 14, and the stage moving mechanism 15 are expanded or contracted from the previous mass spectrometry, and in which direction and how much the condenser lens 13 and the sample stage 14 are changed have been unclear.

In the ionization unit 10 for the imaging mass spectrometer, the microscope 16 for observing a sample placed on the sample stage 14 and the excitation beam irradiation system that irradiates a sample with laser light are independent, and a position of the sample stage 14 when imaging mass spectrometry is performed is different from a position of the sample stage 14 when a sample is observed with the microscope 16. That is, in the ionization unit 10, it is not possible to adjust a focal position of a lens while observing the sample unlike a general microscope. For this reason, in the conventional imaging mass spectrometer using such an ionization unit, it is necessary for the user to move the condenser lens and the sample stage little by little in various directions, adjust positions of the condenser lens and the sample stage by trial and error, and focus laser light on a sample on the sample stage, for which work has taken time and effort.

On the other hand, in the present embodiment, information on reference positions of the condenser lens 13 and the sample stage 14 at a reference temperature and the reference temperature, and the temperature dependency information are stored in advance in the storage unit 31, and the condenser lens 13 and the sample stage 14 on which laser light is focused under a temperature condition at the time of use can be determined on the basis of a difference between the reference temperature and the in-use temperature and the temperature dependency information. For this reason, it is only necessary to move the condenser lens 13 and the sample stage 14 to the positions in a pinpoint manner, and laser light can be easily focused on a sample placed on the sample stage 14. Further, since it is not necessary to provide a special temperature control mechanism, mass spectrometry can be performed at low cost.

When correction of positions of the condenser lens 13 and the sample stage 14 is completed, the measurement control unit 321 executes imaging mass spectrometry of a target region set on a sample placed on the sample stage 14 (Step 8). Imaging mass spectrometry of the target region can be performed in the same manner as conventionally performed. The measurement control unit 321 moves the sample stage 14 with the stage moving mechanism 15 so that a measurement start point among a plurality of measurement points set on a sample placed on the sample stage 14 coincides with a focusing position of laser light, and performs mass spectrometry of the measurement start point. Subsequently, the sample stage 14 is moved by the stage moving mechanism 15 so that a measurement point adjacent to the measurement start point coincides with a focusing position of laser light, and mass spectrometry is performed. This operation is executed for all of a plurality of measurement points so that mass spectrum data of each measurement point is obtained. Then, intensity of a mass peak of a mass-to-charge ratio of ions characteristic of a target substance is extracted from the mass spectrum data of each measurement point and an image in which the intensity of the mass peak at each measurement point is mapped to the target region is created.

The above-described embodiment is merely an example, and can be appropriately modified in accordance with the spirit of the invention. The above embodiment relates to imaging mass spectrometry in which mass spectrometry is performed at each of a plurality of measurement points distributed two-dimensionally. However, even in a case where mass spectrometry is performed at only one measurement point, the same configuration as described above can be used to correct relative positions of the condenser lens 13 and the sample stage 14 so as to focus laser light at a predetermined position on the sample stage 14. In this manner, positional accuracy of a measurement point can be improved. Further, in the above embodiment, a substance on a sample surface is ionized using laser light, but the same configuration as in the above embodiment can also be used in a case where another type of excitation beam such as an electron beam is used.

[Modes]

It will be understood by those skilled in the art that a plurality of the exemplary embodiments described above are specific examples of a mode described below.

(Clause 1)

One mode is a mass spectrometry method for focusing an excitation beam by an excitation beam optical system and irradiating a sample stage movable by a moving mechanism on a fixed base fixed to the excitation beam optical system with the excitation beam, the mass spectrometry method including steps of:

focusing an excitation beam at a predetermined position of the sample stage, and recording a position of a beam irradiation system including the excitation beam optical system and the sample stage at that time as a reference position and a temperature of the beam irradiation system at that time as a reference temperature;

acquiring temperature dependency information which is information representing a change in position of the beam irradiation system with respect to a change in temperature of the beam irradiation system and recording the temperature dependency information; and correcting a focusing position of an excitation beam using the moving mechanism based on the reference position, a difference between a temperature of the beam irradiation system during use and the reference temperature and the temperature dependency information.

(Clause 2)

A mass spectrometer according to another mode includes:
a sample stage;
an excitation beam optical system configured to focus an excitation beam and irradiate the sample stage with the excitation beam;
a moving mechanism configured to move the sample stage on a fixed base fixed to the excitation beam optical system;
a temperature measurement unit configured to measure temperature of a beam irradiation system including the excitation beam optical system and the sample stage;
a storage unit that stores a reference position which is a position of the beam irradiation system when the excitation beam is focused on a predetermined position of the sample stage when the beam irradiation system is at a certain reference temperature, and temperature dependency information which is information representing a change in position of the beam irradiation system with respect to a change in temperature of the beam irradiation system; and
a position correction unit configured to correct a focusing position of an excitation beam using the moving mechanism based on the reference position, a difference between temperature of the beam irradiation system measured by the temperature measurement unit and the reference temperature, and the temperature dependency information.

In the mass spectrometry method according to Clause 1 and the mass spectrometer according to Clause 2, an excitation beam is focused on a predetermined position of the sample stage, and a position of the beam irradiation system including the excitation beam optical system and the sample stage and temperature of the beam irradiation system are recorded as the reference position and the reference temperature. A positional relationship between the excitation beam optical system and the sample stage is determined such that an excitation beam is focused on a predetermined position on the sample stage from the reference position. Further, temperature dependency information, which is information representing a change in position of the beam irradiation system with respect to a change in temperature of the beam irradiation system, is acquired and recorded. The temperature dependency information may be obtained by individually recording a change in position of each of the excitation beam optical system and the sample stage, may be obtained by recording a change in relative position of the excitation beam optical system and the sample stage, or may be obtained by recording a change in focusing position of an excitation beam on the sample stage.

When mass spectrometry is performed, temperature of the beam irradiation system is measured. Then, a focusing position of an excitation beam is corrected using a moving mechanism based on the reference position, a difference between a measured temperature (in-use temperature) and reference temperature, and the temperature dependency information. For example, positions of the excitation beam optical system and/or the sample stage are adjusted so as to reproduce a positional relationship between the excitation beam optical system and the sample stage determined based on the reference position.

In the mass spectrometry method according to Clause 1 and the mass spectrometer according to Clause 2, it is only necessary to determine positions of the sample stage and the excitation beam optical system at which an excitation beam is focused at the in-use temperature, and to move the sample stage and the excitation beam optical system to the positions in a pinpoint manner based on position information of the beam irradiation system including the sample stage and the excitation beam optical system at a reference temperature, the temperature dependency information, and a difference between the reference temperature and the in-use temperature. Therefore, it is possible to easily focus an excitation beam on a sample placed on the sample stage without trial and error as in the related art. Further, since it is not necessary to provide a temperature control mechanism in the mass spectrometry method according to Clause 1 and the mass spectrometer according to Clause 2, mass spectrometry can be performed at low cost.

(Clause 3)

In the mass spectrometer according to Clause 2, the temperature dependency information is information representing a change in position of the excitation beam optical system and a change in position of the sample stage with respect to a change in temperature of the beam irradiation system.

Even between mass spectrometers of the same type, directions and degree of changes in positions of the sample stage and the excitation beam may be different. Further, a change in position of the excitation beam optical system and position of the sample stage has a largest influence on a focusing position of an excitation beam. In the mass spectrometer according to Clause 3, information on a change in position of the excitation beam optical system and a change in position of the sample stage with respect to a change in temperature of the beam irradiation system is used as the temperature dependency information. These pieces of information can be individually acquired by actual measurement for the mass spectrometer. By using such position information, it is possible to correct a focusing position of an excitation beam with high accuracy.

(Clause 4)

In the mass spectrometer according to Clause 2 or 3, the excitation beam optical system includes a laser light source configured to emit laser light and a condenser lens configured to focus laser light emitted from the laser light source.

Among excitation beams, laser light can be focused particularly at a fine diameter, and the mass spectrometer according to Clauses 2 and 3 can be suitably used in a case of performing mass spectrometry with high spatial resolution using laser light focused at a fine diameter as in the mass spectrometer according to Clause 4.

(Clause 5)

In the mass spectrometer according to Clause 4, a condensing diameter of laser light by the condenser lens is 5 μm or less.

The mass spectrometer according to Clause 4 can be particularly suitably used in a mass spectrometer using laser light focused to a diameter of 5 μm or less like the mass spectrometer according to Clause 5.

(Clause 6)

In the mass spectrometer according to any of Clauses 2 to 5, the reference temperature is 25° C. or more and 30° C. or less.

As in the mass spectrometer of Clause 6, by setting the reference temperature to temperature around room temperature, it is possible to reduce a correction amount during use, and focus an excitation beam on a predetermined position with high accuracy.

REFERENCE SIGNS LIST

1 . . . Imaging Mass Spectrometer
10 . . . Ionization Unit
11 . . . Laser Light Source
12 . . . Reflecting Mirror
13 . . . Condenser Lens
14 . . . Sample Stage
15 . . . Stage Moving Mechanism
151 . . . First Linear Guide
152 . . . Second Linear Guide
153 . . . Third Linear Guide
16 . . . Microscope
17 . . . Opening
18 . . . Temperature Measurement Unit
19 . . . Housing
20 . . . Mass Spectrometry Unit
21 . . . Opening
30 . . . Control and Processing Unit
31 . . . Storage Unit
32 . . . Mass Spectrometry Software
321 . . . Measurement Control Unit
322 . . . Position Correction Unit
40 . . . Input Unit
50 . . . Display Unit

The invention claimed is:

1. A mass spectrometry method for focusing an excitation beam by an excitation beam optical system and irradiating a sample stage movable by a moving mechanism on a fixed base fixed to the excitation beam optical system with the excitation beam, the mass spectrometry method comprising steps of:

focusing an excitation beam at a predetermined position of the sample stage, and recording a position of a beam irradiation system including the excitation beam optical system and the sample stage at a time when the excitation beam is focused at the predetermined position as a reference position and a temperature of the beam irradiation system at the time when the excitation beam is focused at the predetermined position as a reference temperature;

acquiring temperature dependency information which is information representing a change in position of the beam irradiation system with respect to a change in temperature of the beam irradiation system and recording the temperature dependency information; and correcting a focusing position of the excitation beam using the moving mechanism based on the reference position, a difference between a temperature of the beam irradiation system during use and the reference temperature, and the temperature dependency information.

2. A mass spectrometer comprising:

a sample stage;

an excitation beam optical system configured to focus an excitation beam and irradiate the sample stage with the excitation beam;

a moving mechanism configured to move the sample stage on a fixed base fixed to the excitation beam optical system;

a temperature measurement unit configured to measure a temperature of a beam irradiation system including the excitation beam optical system and the sample stage;

a storage unit that stores a reference position which is a position of the beam irradiation system when the excitation beam is focused on a predetermined position of the sample stage and stores a reference temperature when the excitation beam is focused at the predetermined position, and temperature dependency information which is information representing a change in position of the beam irradiation system with respect to a change in temperature of the beam irradiation system; and a position correction unit configured to correct a focusing position of the excitation beam using the moving mechanism based on the reference position, a difference between the temperature of the beam irradiation system measured by the temperature measurement unit and the reference temperature, and the temperature dependency information.

3. The mass spectrometer according to claim 2, wherein the temperature dependency information is information representing a change in position of the excitation beam optical system and a change in position of the sample stage with respect to a change in temperature of the beam irradiation system.

4. The mass spectrometer of claim 2, wherein the excitation beam optical system includes a laser light source configured to emit laser light and a condenser lens configured to focus laser light emitted from the laser light source.

5. The mass spectrometer according to claim 4, wherein a condensing diameter of laser light by the condenser lens is 5 µm or less.

6. The mass spectrometer according to claim 2, wherein the reference temperature is 25° C. or more and 30° C. or less.

* * * * *